(12) United States Patent
Abd Dzubir et al.

(10) Patent No.: US 10,288,205 B2
(45) Date of Patent: May 14, 2019

(54) VIBRATION CLAMP

(71) Applicant: Petroliam Nasional Berhad (PETRONAS), Kuala Lumpur (MY)

(72) Inventors: Faizul Azly bin Abd Dzubir, Kuala Lumpur (MY); Neil Speirs, Powys (GB)

(73) Assignee: Petroliam Nasional Berhad (PETRONAS) (MY)

( * ) Notice: Subject to any disclaimer, the term of this patent is extended or adjusted under 35 U.S.C. 154(b) by 0 days.

(21) Appl. No.: 14/435,712

(22) PCT Filed: Oct. 15, 2012

(86) PCT No.: PCT/MY2012/000265
§ 371 (c)(1),
(2) Date: Apr. 14, 2015

(87) PCT Pub. No.: WO2014/062048
PCT Pub. Date: Apr. 24, 2014

(65) Prior Publication Data
US 2015/0260327 A1  Sep. 17, 2015

(51) Int. Cl.
*F16L 55/07* (2006.01)
*F16L 55/035* (2006.01)
*F16L 3/10* (2006.01)
*F16L 58/02* (2006.01)
*F16L 51/00* (2006.01)

(52) U.S. Cl.
CPC ............. *F16L 55/07* (2013.01); *F16L 3/1016* (2013.01); *F16L 3/1091* (2013.01); *F16L 55/035* (2013.01); *F16L 58/02* (2013.01); *F16L 51/00* (2013.01)

(58) Field of Classification Search
CPC .... F16L 55/04; F16L 3/00; F16F 15/02; F16F 9/00
USPC .................................. 248/636; 138/106, 107
See application file for complete search history.

(56) References Cited

U.S. PATENT DOCUMENTS 2,738,151 A * 3/1956 Herzog ..................... F16L 3/18
14/10
3,606,218 A   9/1971 Enlund et al.
(Continued)

FOREIGN PATENT DOCUMENTS

| CN | 204524942 U | * | 8/2015 |
|----|----|----|----|
| FR | 2573175 A1 | | 5/1986 |
| JP | 09-196096 A | | 7/1997 |

OTHER PUBLICATIONS

Shaviv, A.; 2000. Advance in Controlled Release of Fertilizers,"Advances in Agronomy", 71:1-49, Word Version, before printing.

*Primary Examiner* — Kimberly T Wood
(74) *Attorney, Agent, or Firm* — Carstens & Cahoon, LLP; Jeffrey G. Degenfelder

(57) ABSTRACT

A vibration clamp assembly for clamping a pipe to a support, the assembly comprising: an inner clamp arranged to encircle and engage the pipe; an outer clamp arranged to encircle the inner clamp and mount to said support; a plurality of damping blocks fixed to the periphery of the inner clamp and positioned to engage the outer clamp; wherein the damping blocks include a damping layer intermediate the inner and outer clamps, said damping layer arranged to dampen vibration loads from the pipe.

7 Claims, 2 Drawing Sheets

(56) References Cited

U.S. PATENT DOCUMENTS

| | | | | |
|---|---|---|---|---|
| 4,530,478 A | * | 7/1985 | McClellan | F16L 59/135 |
| | | | | 138/106 |
| 6,575,412 B2 | * | 6/2003 | Klezath | F16L 3/1091 |
| | | | | 248/58 |
| 7,328,724 B2 | * | 2/2008 | Britton | F16L 58/10 |
| | | | | 138/106 |

* cited by examiner

VIBRATION CLAMP

CROSS REFERENCE TO RELATED APPLICATIONS

This application is the U.S. national phase of International Application No. PCT/MY2012/000265 filed Oct. 15, 2012, which designated the U.S. The entire contents of which are hereby incorporated by reference.

FIELD OF THE INVENTION

The invention relates to the securing of pipes for industrial application, for instance, in petro-chemical facilities or other such industrial plants. In particular, the invention relates to the securing of said pipes when subject to all types of vibrational loads.

BACKGROUND

Large diameter pipes used for industrial applications may be subject to a range of vibrational loads. In the case of petro-chemical applications, these could include slugs formations in the liquid flow travelling along the pipeline or flow induced vibration (FIV) such as resonance associated with particular flow rates. More typical and general applications include fluid impulse loads such as surge and pulsation of the flow in the pipe. External loads such as wind loads with vortex shedding formation and earthquakes may also apply significant vibrational loads and may even induce resonance within the system. It follows that such vibrational loads, even at relatively low levels, can lead to fatigue at welded of the mounts securing the pipe. The consequential loss of production, not to mention the health and safety issues caused by a catastrophic failure and environmental issues resulting from the release of fluids from the pipeline all represent expensive and potentially tragic consequences.

Conventional pipe mounts involve bolted brackets and collars clamping the pipe to a fixture. These will occasionally also include a moulded or structured seat upon which the pipe may engage.

Such bolted arrangements typically involve tolerances which under vibration and fatigue loads often work loose and therefore require constant maintenance. If friction grip bolts or other high vibrational materials are used to restrain the pipe, then under a thermal load, thermal expansion of the pipe between the pipe mounts may be restricted or hindered adding excessive longitudinal loading to the pipe for which the pipe may not designed.

Thus, conventional methods of restraining pipes are either inadequate for managing the vibrational loads inherent with the use of the pipe or introduce means by which the pipe is overly restrained introducing different problems of an equally serious nature.

SUMMARY OF INVENTION

In a first aspect the invention provides a vibration clamp assembly for clamping a pipe to a support, the assembly comprising: an inner clamp arranged to encircle and engage the pipe; an outer clamp arranged to encircle the inner clamp and mount to said support; a plurality of damping blocks fixed to the periphery of the inner clamp and positioned to engage the outer clamp; wherein the damping blocks include a damping layer intermediate the inner and outer clamps, said damping layer arranged to dampen vibration loads from the pipe.

By providing the inner clamp on the pipe, a secure direct engagement of the pipe is provided. However, the vibrational isolation provided by the blocks also overcomes the transfer of vibrational load from the pipe to the outer clamp which in turn provides the fixity for the pipe.

This arrangement has the further advantage of being applicable to both insulated and non-insulated pipes.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
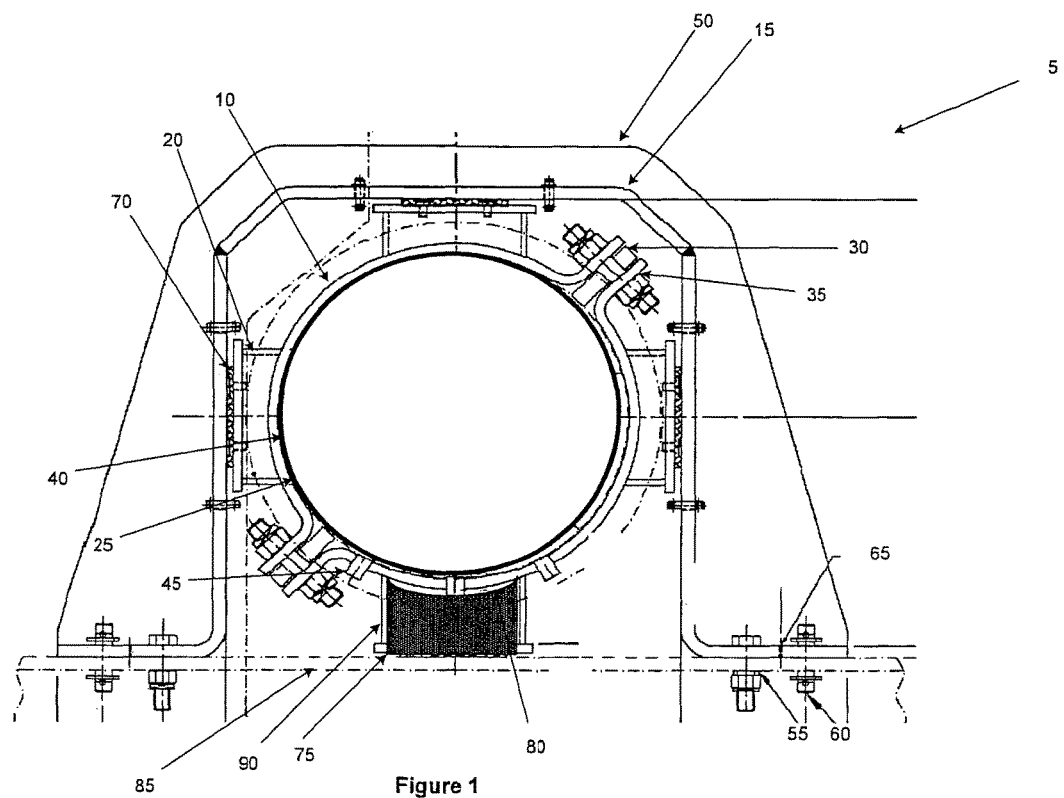
FIG. 1 is an elevation view of a vibration clamp assembly according to one embodiment of the present invention.
Figure 2:
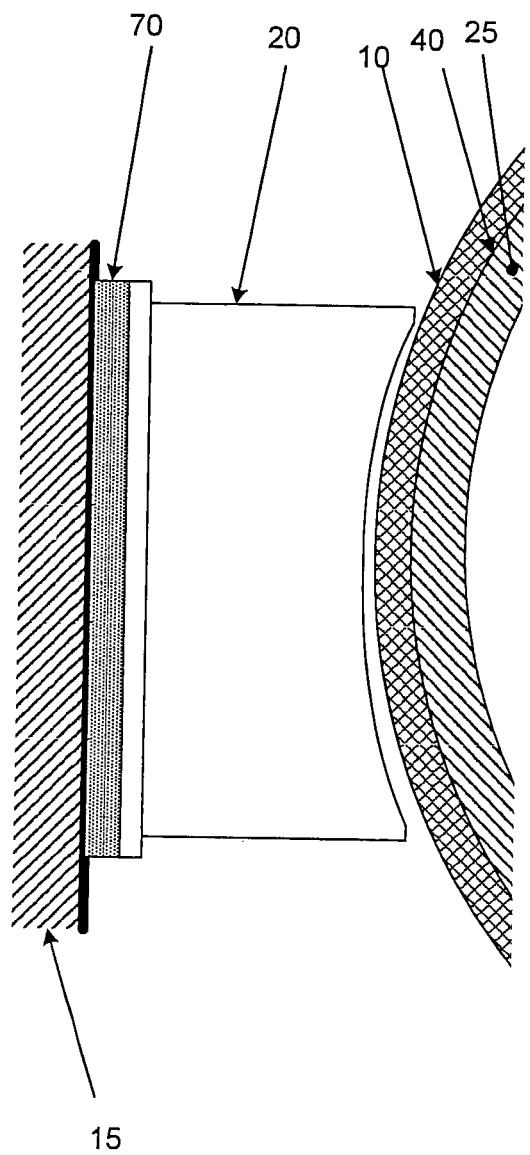
FIG. 2 is a detail view of a damping block for the vibration clamp assembly of claim 1.

FIG. 1 shows a vibration clamp assembly, or pipe vibration mount, 5 used to restrain a pipe whilst avoiding the detrimental issues associated with vibration.

The pipe vibration mount 5 comprises an inner clamp 10 mounted to an outer clamp 15 through damping blocks, in the present case, trunnions 20. In this embodiment there are four damping blocks 20 uniformly distributed about the circumference of the inner clamp 10. However, it will be appreciated that in alternative embodiments still falling within the present invention there may be three (3) damping blocks or even two (2) or in fact as four (4) as such a maximum number about the circumference. The present invention is dependant upon isolating the inner clamp 10 from the outer clamp 15 in terms of vibration and the most efficient means of doing so within the scope of the present invention may depend on range of factors including the diameter of the pipe, the degree of vibration to be isolated, the fixture to which the pipe is to be clamped, etc.

The damping blocks 20 include a dampening pad 70 in contact with the outer clamp 15 such that vibration transmitted through the damping block is damped by the pad 70 and so isolating the inner clamp from the outer clamp.

The inner clamp 10 is bolted to the pipe 25 so as to provide a close intimate contact. In this embodiment the pipe has coupling lugs 30 welded to the outside diameter. The inner clamp 10 includes a bolted flange 35 so as to bolt the inner clamp 10 through the lug 30 and provide the required engagement with the pipe. To prevent crevice corrosion between the inner clamp 10 and the pipe 25 an anti-corrosion layer such as PTFE is placed intermediate the inner clamp and pipe.

A characteristic of the damping pad 70 is not only the damping effect on vibrational loads but also to provide a low friction engagement with the outer clamp 15. Thus, the inner clamp 10 is free to slide longitudinally within the outer clamp and so on application of a thermal loading (external or internal) to the pipe the subsequent extension of the pipe allows for slip between the inner and outer clamps avoiding a stress concentration at the vibration mount. Apart from the bolted connection to the pipe, the pipe further includes lugs 45 also welded to the outer diameter of the pipe. These lugs act as interference by butting against the inner clamp 10.

Thus, on thermal expansion of the pipe 25 the inner clamp is prevented from sliding relative to the pipe by the interference of said lugs 45.

In this embodiment, the outer clamp comprises bent and welded plate to form a frame about the pipe 25. It is further stiffened by a rib 50 which strengthens the welded plate of the outer clamp making a secure connection to fix the pipe.

A feature of the present invention is the ability to mount the outer clamp to a fixture using precision drilling of a pin connection 60. The precision drill hole has effectively no tolerance and therefore prevents movement through shifting of the bolted connections of the outer clamp which would normally occur using a normal bolted connection.

Pipe mounts of the prior art require the bolted connections to have significant tolerances due to the thermal expansion of the pipe to which it is mounted. Because prior art pipe mounts do not permit slippage between the clamp and the expanding pipe to prevent a stress build up the tolerance of the bolted connection is required to relieve stress. However for the pipe mount of the present invention because the inner and outer clamps are able to slip freely on expansion of the pipe no tolerance of the outer clamp bolted connections is required and so allows for a precision drill bolted connection to accurately secure the pipe in place.

A further embodiment of the present invention is to have the vibration mount 5 act as an anchor for the pipe 25. To convert the vibration mount 5 to an anchor an additional block 75 is bolted to the base plate 85 using precision drilling. The block 75 acts as a cradle for the pipe 25 together with abutting the lower damping block 90 at the base of the inner clamp. Thus, whilst the damping blocks are not restrained from sliding relative to the outer clamp, the anchor block 75 prevents the sliding of the inner clamp and so all expansion of the pipe occurs from this point. An anti-corrosion layer 80 may also be incorporated between the anchor blocks 75 and the pipe 25 to prevent crevice corrosion. Preferably this anti-corrosion layer includes PTFE.

The anchor block may be mounted on a slide having a worm screw (not shown). This allows the anchor block 75 to have a fine adjustment of the longitudinal position. Such a fine adjustment allows the anchor block to abut the damping block 90 and so prevent any slippage. In a further embodiment, the anchor block 75 may have an engagement lug (not shown) that couples with a corresponding recess on the damping block 90. The fine adjustment of the worm screw may then allow the lug and recess to engage to a high tolerance, further locking the pipe clamp assembly 5 from moving under load.

The invention claimed is:

1. A vibration clamp assembly for clamping a pipe to a support, the assembly comprising:
   an inner clamp arranged to encircle and engage the pipe;
   an outer clamp arranged to encircle the inner clamp and further arranged to be mounted to said support;
   a plurality of damping blocks fixed to a periphery of the inner clamp and positioned in a sliding engagement with the outer clamp;
   wherein the damping blocks include a damping layer intermediate the inner and outer clamps, said damping layer arranged to dampen vibration loads from the pipe and further arranged to allow longitudinal sliding relative to the outer clamp; and
   wherein the vibration clamp further includes at least one anchor block mounted to one of the plurality of damping blocks, the at least one anchor block is fixed relative to the outer clamp, such that on thermal expansion of the pipe, said at least one anchor block prevents relative movement between the inner and outer clamps.

2. A vibration clamp assembly according to claim 1, further including lugs arranged to be welded to said pipe on either side of said inner clamp, said lugs positioned such that on thermal expansion of said pipe said lugs prevent relative movement between the pipe and inner clamp.

3. A vibration clamp assembly according to claim 1, wherein the plurality of damping blocks are uniformly distributed about the circumference of the inner clamp.

4. A vibration clamp assembly according to claim 1, further including a corrosion resistant layer intermediate the inner clamp and pipe.

5. A vibration clamp assembly according to claim 1, further including coupling lugs arranged to be welded to the pipe and flanged connection on the inner clamp, said flanged connection arranged to bolt the inner clamp to the pipe through said coupling lugs.

6. A vibration clamp assembly according to claim 1, wherein the damping blocks are trunnions.

7. A vibration clamp assembly according to claim 1, further including precision drilled pins for mounting the outer clamp, said pins positioned to facilitate close tolerance of connection between the outer clamp and the support.

* * * * *

UNITED STATES PATENT AND TRADEMARK OFFICE
CERTIFICATE OF CORRECTION

PATENT NO. : 10,288,205 B2
APPLICATION NO. : 14/435712
DATED : May 14, 2019
INVENTOR(S) : Faizul Azly bin Abd Dzubir and Neil Spiers Page 1 of 1

It is certified that error appears in the above-identified patent and that said Letters Patent is hereby corrected as shown below:

On the Title Page

Column 1, please change:
(72) Inventors: Faizul Azly bin Abd Dzubir, Kuala Lumpur (MY); Neil Speirs, Powys (GB)

To:
(72) Inventors: Faizul Azly bin Abd Dzubir, Kuala Lumpur (MY); Neil Spiers, Powys (GB)

Signed and Sealed this
Thirtieth Day of July, 2019

Andrei Iancu
*Director of the United States Patent and Trademark Office*